F. T. NICHOLSON.
METHOD OF MAKING PAPER RECEPTACLES.
APPLICATION FILED MAY 11, 1916.
1,330,334.
Patented Feb. 10, 1920.
5 SHEETS—SHEET 1.
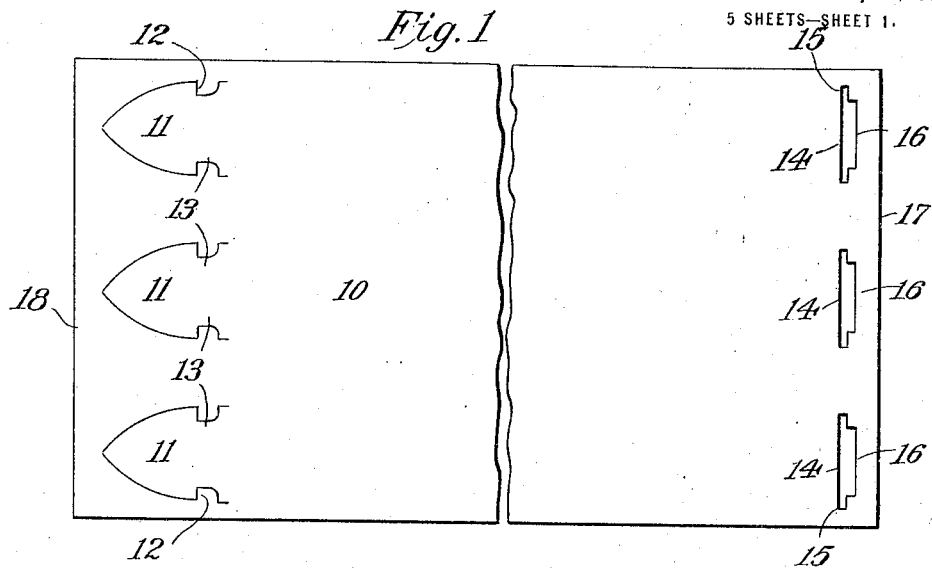
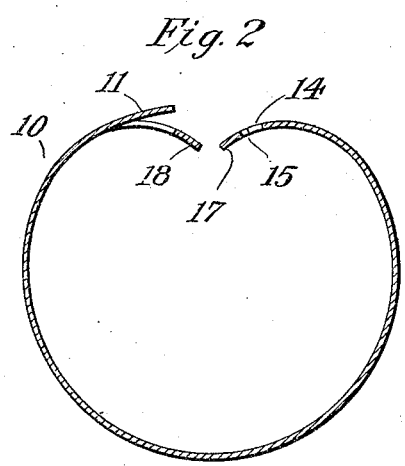
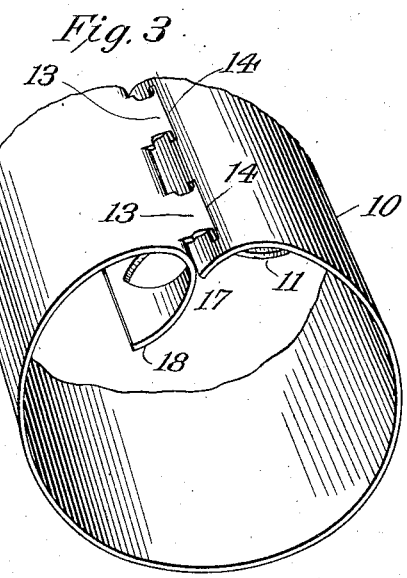
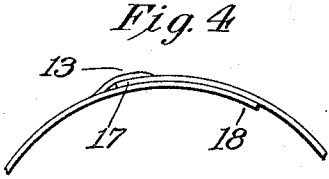
Inventor
Fred T. Nicholson
By his Attorneys
Kerr, Page, Cooper & Hayward F. T. NICHOLSON.
METHOD OF MAKING PAPER RECEPTACLES.
APPLICATION FILED MAY 11, 1916.

1,330,334.  Patented Feb. 10, 1920.
5 SHEETS—SHEET 2.

Inventor
Fred T. Nicholson
By his Attorneys
Kerr, Page, Cooper & Hayward

F. T. NICHOLSON.
METHOD OF MAKING PAPER RECEPTACLES.
APPLICATION FILED MAY 11, 1916.
1,330,334.
Patented Feb. 10, 1920.
5 SHEETS—SHEET 3.
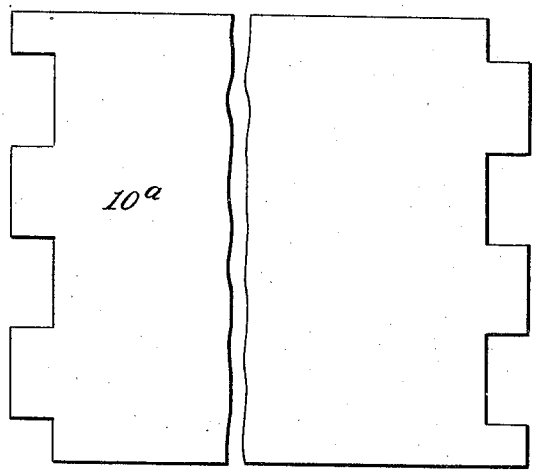
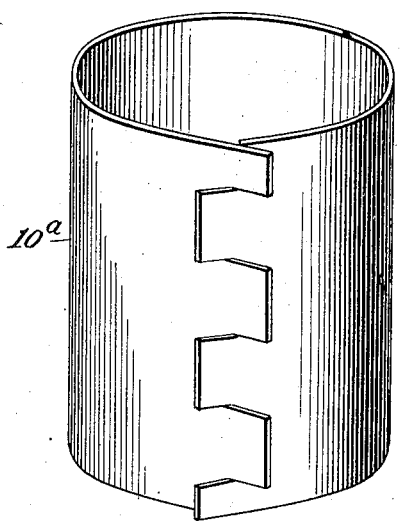
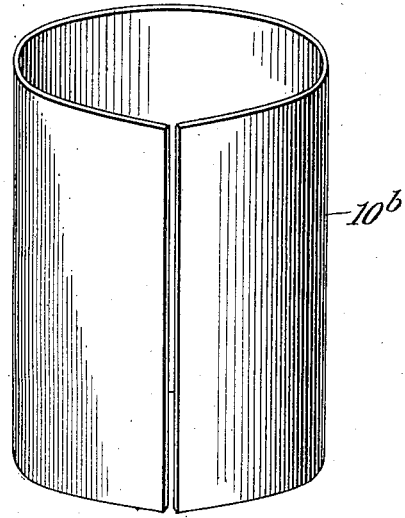
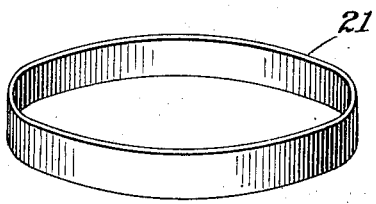
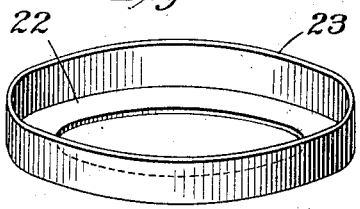

F. T. NICHOLSON.
METHOD OF MAKING PAPER RECEPTACLES.
APPLICATION FILED MAY 11, 1916.

1,330,334.

Patented Feb. 10, 1920.
5 SHEETS—SHEET 4.

Inventor
Fred T. Nicholson
By his Attorneys
Kim, Page, Cooper & Hayward

F. T. NICHOLSON.
METHOD OF MAKING PAPER RECEPTACLES.
APPLICATION FILED MAY 11, 1916.
1,330,334.
Patented Feb. 10, 1920.
5 SHEETS—SHEET 5.
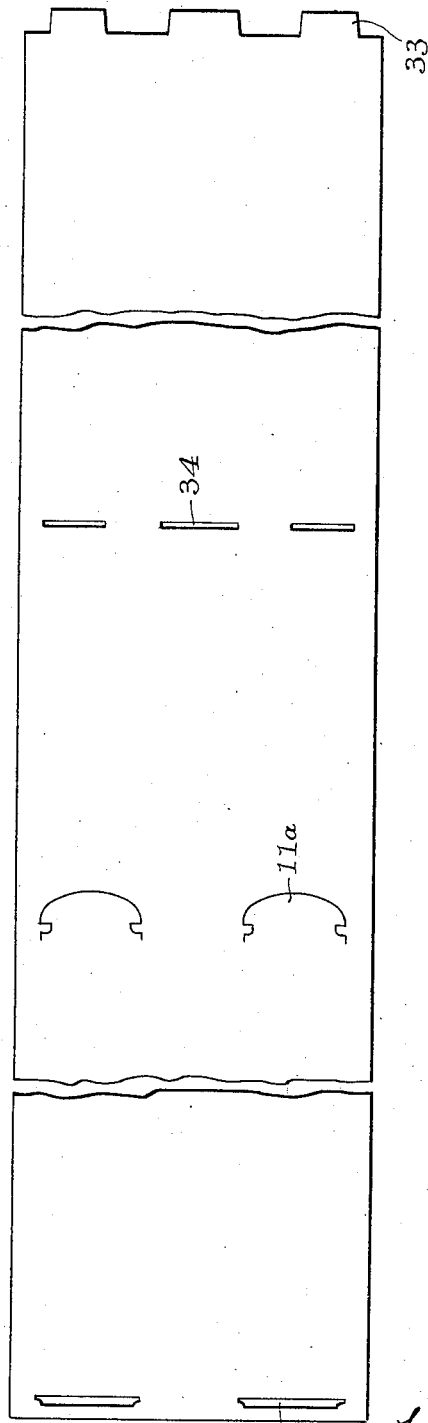
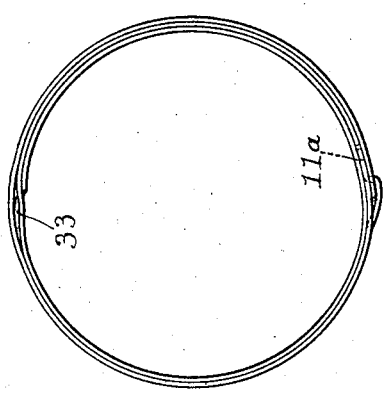
Inventor
Fred T. Nicholson
By his Attorneys
Kerr, Page, Cooper & Hayward

UNITED STATES PATENT OFFICE.

FRED T. NICHOLSON, OF BLOOMFIELD, NEW JERSEY.

METHOD OF MAKING PAPER RECEPTACLES.

1,330,334.  Specification of Letters Patent.  Patented Feb. 10, 1920.

Application filed May 11, 1916. Serial No. 96,759.

*To all whom it may concern:*

Be it known that I, FRED T. NICHOLSON, a citizen of the United States, residing at Bloomfield, in the county of Essex and State of New Jersey, have invented certain new and useful Improvements in Methods of Making Paper Receptacles, of which the following is a full, clear, and exact description.

This invention relates to the manufacture of paper receptacles or containers, particularly water-proof receptacles for liquids or semi-liquids, or for perishable goods or other materials which are to be protected from moisture, dust, and other sources of contamination. Efforts to provide such containers have been made heretofore, but so far as I am aware none of them has been wholly successful. In some of the prior containers the defects have been inherent in the article or in its mode of construction; while others, which have given greater promise of success, have proved impracticable by reason of high cost of manufacture. I have accordingly been led to devise my present invention, which has for its chief object to provide an improved container or receptacle which shall possess the necessary qualities of strength and durability so as to bear handling and shipping, etc., and which can be manufactured at low cost. To these and other ends the invention consists in the novel features of construction and combinations of elements hereafter described.

A convenient and effective form of receptacle produced by the invention is illustrated in the accompanying drawings, in which—

Figure 1 shows in plan a sheet or strip of paper as cut preparatory to shaping or bending to form the body or part of the body of the container.

Fig. 2 is a cross section of the strip of paper as bent preparatory to locking its ends together to form a cylinder or other tubular body.

Fig. 3 is a perspective view showing the tubular body formed by bending the paper strip, but with the locking of the ends of the strip incomplete.

Fig. 4 is a fragmentary end view of the tubular body, showing the lock as it appears when complete.

Figs. 10, 11 and 12 illustrate other tubular shells which may be used in the container.

Fig. 13 shows in perspective a closure suitable for use with my improved container or receptacle.

Fig. 14 shows in perspective a suitable closure-seat for use when one closure is to be removable and replaceable.

Fig. 19 is a plan view of a blank adapted to be formed into a tube or receptacle-body by coiling, so that the successive nested shells are continuous with each other.

Fig. 20 is an end view of a tube or receptacle body made from the blank shown in Fig. 19.

Figure 5:
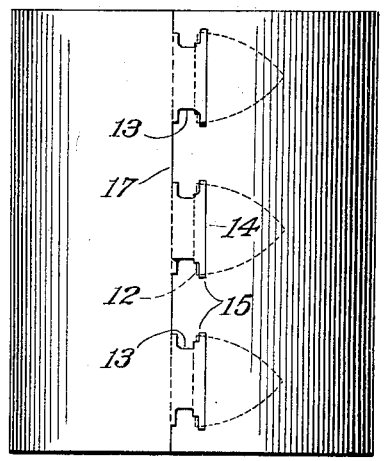
Fig. 5 is a side view of the same.

My improved container, preferably but not necessarily circular in cross-section, is formed of one or more paper shells or tubes, each formed by bending a strip of paper and locking the ends of the strip together; the dimensions and proportions of the strip or strips being dependent upon the capacity and proportions which the finished container is to have. Such a strip is shown at 10 in the drawings, and is shown in Fig. 1. The strip is cut at one end to form longitudinally extending tongues 11 (preferably pointed as shown) having shoulders 12 and shouldered necks 13 connecting the tongues to the body of the strip. At the other end the strip is provided with the same number of transverse slots 14, having at their inner edges lateral slits or extensions 15 to permit the aforesaid tongues to pass, the slots themselves being of substantially the same width as the necks 13. Moreover, the distance between the outer edges 16 of the slots and the end-edge of the strip is about equal to the length of the necks 13.

The strip of paper, provided at its ends with tongues and slots as illustrated in Fig.

1, is now bent around a transverse axis, for example as shown in Fig. 2, in which it will be observed that the end-edges of the strip are turned in toward the axis of the tube. The arrow-shaped tongues are next passed into the slots 14 through the lateral extensions 15 and the necks 13 are drawn down into the slots as in Fig. 3, still keeping the end-portions of the strip bent in toward the axis of the tube.

Having inserted the tongues into the slots as explained above and as shown in Fig. 3, the end 17 is pushed up into the bight between the necks and the body of the paper, thereby permitting the end 18 to spring up, against the inner surface of the tube, as in Fig. 4. The tube now has the appearance shown in Fig. 5, in which it will be seen that the paper between the slots 14 and the adjacent end-edge is bound between the shoulders 12 on the tongues and the bight formed by the necks 13 and the body of the tube. If the attempt is made to expand the tube circumferentially the pull is resisted by the tongue-shoulders 12, and hence such expansion is prevented, and the lock is effective throughout substantially the entire length of the shell. Similarly, the tube cannot be contracted circumferentially, since the edge of the end 17 is already snugly fitted into the bight at the base of the necks 13. Nor can either end of the strip be shifted laterally with respect to the other, since the necks 13 are seated in the body portions of the slots 14, which body portions are no wider than necessary to receive said necks and allow the same to lie flat without wrinkling. In short, the ends of the strip are positively locked against displacement relative to each other in any direction laterally and circumferentially, so that the shell has a fixed perimeter.

If the container is to be water or moisture-proof, the paper of which the shell is made is impregnated, or at least coated on one side, with suitable material, as for example, paraffin wax, preferably before the tongues and slots are cut. Paper so impregnated is common, and can be purchased in any desired quantity. If the impregnation is done after the tube is formed it can be effected by dipping the tube into melted paraffin and keeping the tube hot till the surplus wax has drained off. If the tube is made of paper already impregnated or coated it is simply heated in any convenient manner, as in any suitable oven, to a temperature sufficient to soften or melt the wax. As the natural resiliency of the paper produces a stress tending to expand the tube radially, it will be seen that the parts which constitute the "lock" are held snugly against each other, with the result that when the wax softens (and subsequently hardens as the tube cools) the contiguous surfaces are cemented together and all cracks filled with wax, making it impossible for water or other substances to penetrate the lock-joint. Moreover, in practice the slots and tongue are die-cut by machinery and hence fit accurately, thereby insuring the production of a thoroughly tight joint by the fusion and subsequent congelation of the wax or other cementitious substance with which the paper or the ends thereof are impregnated. The inner and outer shells may be impregnated differently, should occasion for such treatment arise. For instance, the innermost shell can be made grease-proof by impregnation or coating with "water glass" and the outer shell moisture-proof by impregnation or coating with paraffin, or vice versa.

Figure 6:
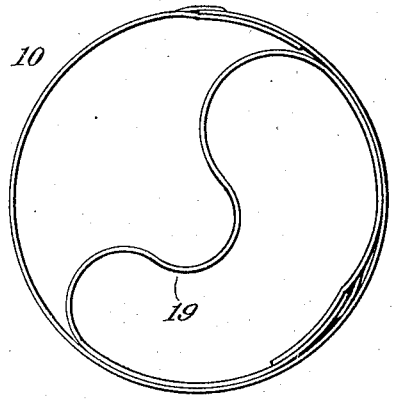
Fig. 6 is an end or plan view showing the method of nesting two tubular bodies together to form a two layer body.
Figure 7:
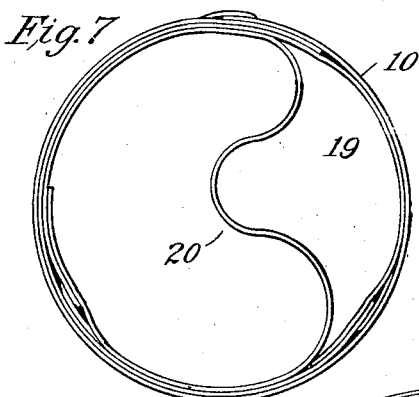
Fig. 7 shows the nesting of a third body in the first two, to form a three-layer body.
Figure 8:
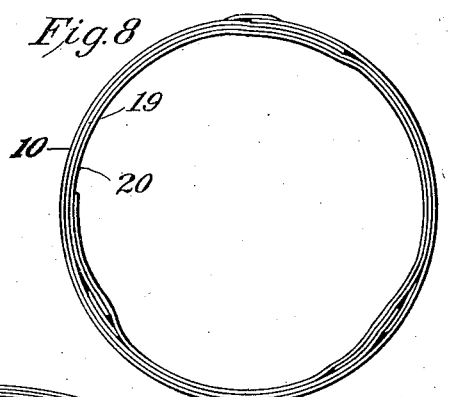
Fig. 8 is an end or plan view showing the three-layer body complete.
Figure 9:
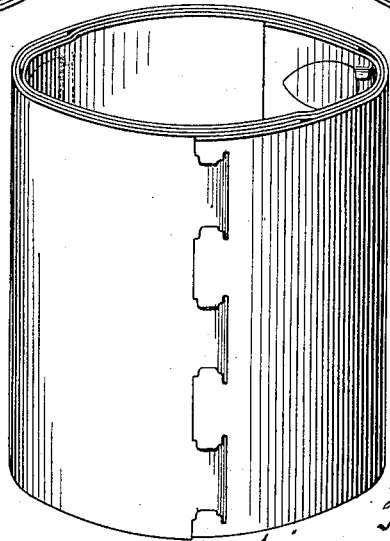
Fig. 9 is a perspective view of the same.

If the paper has sufficient body and stiffness to serve the purpose for which the container is intended the tube may now be considered complete, and the heads or closures may be put in place. If not, the tube or shell can be built up to any desired thickness and strength by nesting two or more tubes together. Such inner shells may be made with the same lock as the outer shell, but are of successively smaller diameter. The shells are assembled as illustrated in Fig. 6, the inner shell 19 being laterally invaginated so that it can be inserted in the outer, after which the inner shell springs out to its original form, as in Fig. 7, the resiliency of the paper causing the inner shell to bear snugly against the outer with close frictional contact. If desired, a third shell, 20, or as many as may be needed to give the body the proper strength, can be inserted, as in Fig. 7, preferably staggering the several joints and spacing them equally around the circumference. The three-ply shell then has the appearance shown in Fig. 8.

As many shells having been assembled as may be necessary or desirable to form the body of the receptacle, the whole is heated to melt the wax with which the shells are impregnated. Inasmuch as each inner shell is pressed snugly against the contiguous outer shell by the natural resiliency of the paper, combined with the fact that the shells are unable to contract by reason of the peculiar mechanical locking of the ends of the strip, the heating and subsequent cooling cause the shells to adhere together and seals the joints, with the result that the body becomes to all intents and purposes an integral, homogeneous whole.

Since the assembled or nested shells are heated to seal them together, it is not necessary to heat each shell separately, before nesting. Nor is it necessary that each shell be impregnated or coated with wax before assembly, as the nested shells can be sealed together by dipping after assembly into melted wax. I prefer, however, to make the shells, or at least the outermost and innermost, of paper impregnated or coated with wax and then seal them only after they have been assembled.

Instead of making all the shells of strips having their ends locked against all relative displacement axially and circumferentially, as in Fig. 5, for example, the inner shell or shells may have the ends of the strips locked to prevent axial displacement of the ends and contraction of the perimeter. For such purpose the joint shown in Figs. 10 and 11 answers very well. Here the strip 10ª, Fig. 10, has its ends tongued and notched to fit snugly together when bent to form the tubular shell, as in Fig. 11. The joint itself then prevents axial displacement of either end and also, prevents contraction of the perimeter, expansion being prevented by the outermost shell (of fixed perimeter) after the shells are nested together. Or, the innermost shell may be like Fig. 5 or Fig. 10, for example, and any shell or shells used between the innermost and outermost may be formed of plain strips, as 10ᵇ, Fig. 12, of such length that their ends will be practically, if not actually, in contact when nested into the outer shell. The outermost shell then prevents expansion of all the inner shells and the innermost prevents contraction of the intermediate shell or shells.

The ends for the tubular body may be in the form of shallow cups, as 21, formed by die-pressing a disk of card, or paper of the requisite stiffness, or several layers of thin paper, the cup being formed by any suitable machine before or after impregnation with the wax or other cementitious substance. Usually, one of the closures is permanently secured in place and the other is intended to be removable. For the latter it is convenient to provide an annular seat, as 22, provided with an upstanding flange 23, the whole being formed by die-pressing, as in the case of the permanent closure already described. Both the permanent closure and the seat for the removable closure are secured in place by adhesion of the wax with which they and the tubular body are impregnated, such adhesion being produced by heating the parts after they are assembled. The preferred method is to insert the closure and the seat before the nested shells are heated to cement them together, so that a single heating suffices for both purposes.

Figure 15:
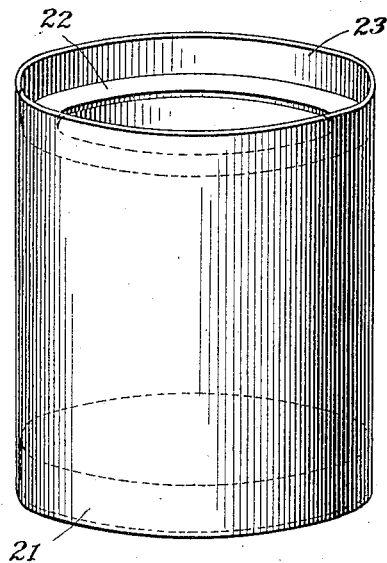
Fig. 15 shows in perspective a receptacle having one closure permanently fixed in position and a seat for a removable closure.
Figure 16:
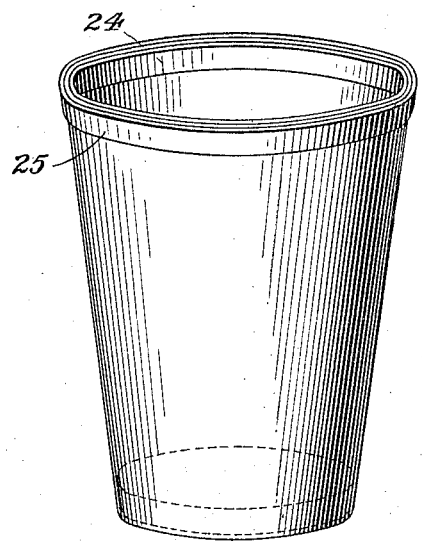
Fig. 16 shows in perspective a receptacle designed for use as a drinking cup.

The receptacle now appears as in Fig. 15. The open end may be closed by a removable disk of card or sheet metal (not shown) or by a removable cup of metal or card like that illustrated in Fig. 13. Also, both closures may be of metal suitably shaped; and both, whether of paper, cardboard, or metal can be removable, or one removable and replaceable, or neither replaceable. In the latter case the contents of the receptacle must of course be inserted before the second closure is secured in place. The chief advantage of using cup-shaped closures lies in the reinforcement which they give to the ends of the tubular body. Of course for some purposes, as for example when the receptacle is intended for use as a drinking cup for soda fountains, only one closure need be provided. In such cases the upper edge of the cup can be reinforced, as by a ring of wax-impregnated paper or cardboard inside or outside of the body, or both, as in Fig. 16, where inner and outer reinforcing rings are shown at 24 and 25, respectively.

Figure 17:
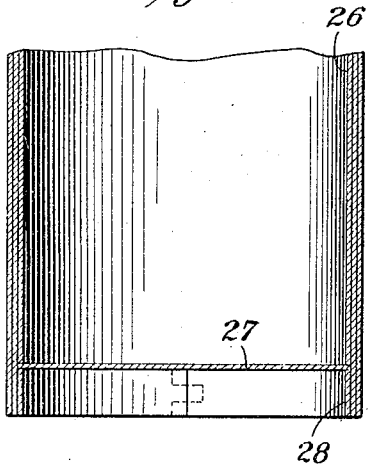
Figs. 17 and 18 show other forms of closure-construction suitable for my improved container.
Figure 18:
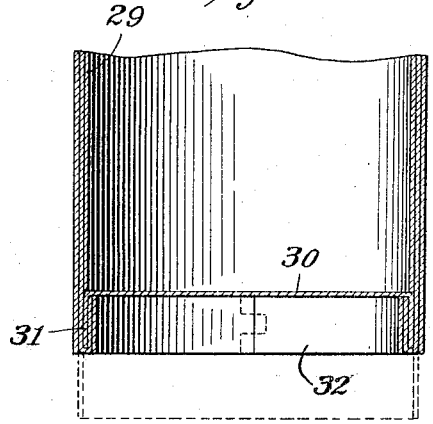

Another form of permanent-closure construction is illustrated in Fig. 17. Here the innermost shell 26 is shorter than the rest, to provide a seat for the disk 27. If the adhesion of the wax or other cementitious substance at the edge of the disk and the friction of the disk on the tubular body are not sufficient to hold the disk in place with the desired security additional support may be provided by means of a ring 28 below the disk. This ring may be formed, for example, by bending a narrow strip of thick paper, or of several rings nested together like the body. A joint like that shown in Fig. 11 can be used to prevent contraction of the ring or of the innermost ring, and axial displacement of the ends of the strip or strips. The rings 28, whether composed of one or a plurality of thicknesses, is preferably cemented in place. In the closure construction shown in Fig. 18 the innermost shell 29 is short, to afford a seat for the inverted cup-shaped closure 30, and the next outer shell is longer, as indicated in dotted lines. This depending portion is turned up over the closure flange 31 and is preferably of such length as to come in contact with the body of the closure. If the wax or other cement used is not sufficient to prevent the turned-up portion of the shell from wrinkling or otherwise coming away from the closure flange a stiff ring 32, like that shown at 28 in Fig. 17, may be inserted to hold such turned up portion in place. The construction shown in Fig. 18 makes the closure practically an integral part of the body, and also affords a very strong rim, capable of withstanding pressure or blows of considerable force without material injury, if any.

The body of the receptacle can also be made with its successive nested shells continuous with each other, by coiling or rolling a strip of sufficient length and locking at least the outer shell or turn with my improved lock. A convenient blank for such purpose is shown in Fig. 19. With that particular blank the right hand end is rolled or coiled up and the tongues 33 inserted in the slots 34. This forms the innermost shell, and locks it against circumferential contraction and against longitudinal displacement of its coöperating portions. The coiling is then continued and finally the outermost shell or turn is locked in the manner already described by means of the tongues 11ª and slots 16ª. An end view of a tube made in this manner is shown in Fig. 20. Such a shell lends itself readily to different treatment of its two ends. For example, the end bearing the tongues 33 and slots 34 can be dipped in paraffin to make the innermost shell waterproof, and the other end, which forms the outermost shell or turn, can be sprayed with water-glass solution, say after the tube is formed to make it grease-proof.

The provision of a tubular container-body which is composed of one or more layers or thicknesses but which is, as a whole, of fixed perimeter, is a highly important feature, for the reason, among others, that the body maintains its proper form during the heat and cooling without the necessity of using an inner or an outer support to prevent contraction or expansion. Heretofore in making containers, as by coiling a strip of paper on a mandrel and subsequently or simultaneously cementing the coils together with wax, the cementing must be done while the shell is on the mandrel, and while the convolutions or turns are held on the outside to prevent their uncoiling; after which the tube so formed must be freed from the mandrel and the outer supporting or holding devices. This has so lengthened the time of manufacture of each individual container as to make the ultimate cost prohibitive. In my container, however, the shell or shells can not uncoil or otherwise change their form after assembly, and hence do not require to be held on a mandrel or in a sleeve or by other means for a similar purpose during the heating, but can simply stand on end in an oven or other heating chamber.

I have specified "paper" as the material of which the receptacle is made, but it is to be understood that any other suitable fabric can be used for the purpose.

The article produced by my method is not claimed herein but is claimed in my Patent No. 1,178,748, dated April 11, 1916.

It is to be understood that the invention is not limited to the construction herein specifically described.

I claim:

1. In the art of making a receptacle or container, bending to tubular form a plurality of strips of paper, and mechanically interlocking the ends of at least one of said strips together across substantially the entire width of the strip for preventing relative radial, lateral and axial displacement of said ends in any direction to form the outermost shell of the body of the container; mechanically interlocking the ends of another of said strips across substantially its entire width, to prevent circumferential contraction at any point, to form the innermost shell; nesting the shells together by laterally infolding the inner shell or shells, inserting the same into the outermost shell, and allowing the inner shell or shells to spring out snugly against the contiguous outer shell, whereby to produce a non-expansible and non-contractible tubular body composed of a plurality of nested shells; and securing one or more closures to the tubular body.

2. In the art of making a receptacle or container, bending to tubular forms a plurality of strips or sheets of waxed paper and mechanically locking the ends of at least one strip or sheet together against relative displacement radially, axially and circumferentially, whereby to provide a plurality of paper shells of which at least one is of fixed perimeter; nesting the other shells into the shell of fixed perimeter by laterally infolding each inner shell, inserting it into the next outer shell, and allowing it to spring out against the next outer shell, whereby each inner shell is caused to bear snugly upon the contiguous outer shell without inner support; fitting to the tubular body so formed one or more waxed closures; heating the whole to soften the wax of the body and closure or closures; and then cooling the whole.

3. In the art of making a tubular body for a receptacle or container, bending to tubular form a strip of paper having, at one end and at a suitable distance therefrom, coöperating means adapted to lock the shell so produced against circumferential contraction; locking said coöperating means together for the purpose mentioned; inclosing the shell so formed in one or more outer shells, proportioned to cause each inner shell to bear snugly against the contiguous outer shell over their entire surfaces; and mechanically locking one end of the outermost shell to the contiguous portion thereof throughout substantially the entire length of the shell to prevent radial, longitudinal and circumferential displacement of the locked portion in all directions.

4. In the art of making a receptacle or container, forming a tubular paper shell of non-expansible and non-contractible perimeter throughout substantially its entire length, bending to tubular form a strip of paper and securing its ends throughout substantially its entire length to prevent circumferential contraction of the shell at any point in its length, laterally infolding the last named shell and inserting it into the first named shell, and allowing it to spring out against the contiguous outer shell to produce snug frictional contact therewith.

5. In the art of making a receptacle or container composed of nested shells, forming a tubular paper shell of non-expansible and non-contractible perimeter throughout substantially its entire length to form the outermost shell, bending to tubular form one or more strips of paper to form one or more inner shells and securing together across substantially its entire width the ends of at least one of said strips as the innermost shell to prevent circumferential contraction at any point in its length, laterally infolding the inner shell or shells and inserting the same into the outermost shell, and allowing each inner shell to spring out against the contiguous outer shell to produce permanently snug contact therewith, whereby the resulting tubular body is capable of withstanding lateral distortion without causing its component shells to separate or shift in position.

In testimony whereof I hereunto affix my signature.

FRED T. NICHOLSON.